US012597432B2

(12) United States Patent
Yeh

(10) Patent No.: US 12,597,432 B2
(45) Date of Patent: Apr. 7, 2026

(54) HUM NOISE DETECTION AND REMOVAL FOR SPEECH AND MUSIC RECORDINGS

(71) Applicant: Dolby International AB, Dublin (IE)

(72) Inventor: Chunghsin Yeh, Barcelona (ES)

(73) Assignee: Dolby International AB, Dublin (IE)

( * ) Notice: Subject to any disclaimer, the term of this patent is extended or adjusted under 35 U.S.C. 154(b) by 357 days.

(21) Appl. No.: 18/007,025

(22) PCT Filed: Jul. 28, 2021

(86) PCT No.: PCT/EP2021/071148
§ 371 (c)(1),
(2) Date: Jan. 26, 2023

(87) PCT Pub. No.: WO2022/023415
PCT Pub. Date: Feb. 3, 2022

(65) Prior Publication Data

US 2023/0290367 A1 Sep. 14, 2023

Related U.S. Application Data

(60) Provisional application No. 63/223,252, filed on Jul. 19, 2021, provisional application No. 63/088,827, filed on Oct. 7, 2020.

(30) Foreign Application Priority Data

Jul. 30, 2020 (ES) ................................ ES202030814

(51) Int. Cl.

| | |
|---|---|
| ***G10L 21/0232*** | (2013.01) |
| ***G10L 25/18*** | (2013.01) |
| ***G10L 25/21*** | (2013.01) |
| ***G10L 25/84*** | (2013.01) |

(52) U.S. Cl.
CPC .......... *G10L 21/0232* (2013.01); *G10L 25/18* (2013.01); *G10L 25/21* (2013.01); *G10L 25/84* (2013.01)

(58) Field of Classification Search
CPC ..... G10L 21/0232; G10L 25/18; G10L 25/21; G10L 25/84; G10L 21/0216; G10L 25/78; G10L 2021/02085; G10L 2021/02168
See application file for complete search history.

(56) References Cited

U.S. PATENT DOCUMENTS

| | | | | |
|---|---|---|---|---|
| 5,550,924 | A * | 8/1996 | Helf | G10L 21/0208 704/226 |
| 7,209,567 | B1 * | 4/2007 | Kozel | H04R 3/007 704/226 |

(Continued)

FOREIGN PATENT DOCUMENTS

| | | | |
|---|---|---|---|
| CN | 1728237 | A | 2/2006 |
| CN | 101149928 | A | 3/2008 |

(Continued)

OTHER PUBLICATIONS

Rao et al., ("Frequency warped modeling of vowel spectra: Dependence on vowel quality", Speech Communication, vol. 47, Issue 3, pp. 322-335, 2005. https://doi.org/10.1016/j.specom.2005.02.009) (Year: 2005).*

(Continued)

*Primary Examiner* — Bhavesh M Mehta
*Assistant Examiner* — Jangwoen Lee

(57) ABSTRACT

Described are methods of processing audio data for hum noise detection and/or removal. The audio data comprises a plurality of frames. One method incudes: classifying frames of the audio data as either content frames or noise frames, using one or more content activity detectors; determining a noise spectrum from one or more frames of the audio data that are classified as noise frames; determining one or more hum noise frequencies based on the determined noise spectrum; generating an estimated hum noise signal based on the one or more hum noise frequencies; and removing hum noise from at least one frame of the audio data based on the (Continued)

estimated hum noise signal. Also described are apparatus for carrying out the methods, as well as corresponding programs and computer-readable storage media.

20 Claims, 6 Drawing Sheets

(56) References Cited

U.S. PATENT DOCUMENTS

| | | | | |
|---|---|---|---|---|
| 9,978,393 | B1 * | 5/2018 | Nokes | H04R 3/00 |
| 10,115,412 | B2 | 10/2018 | Von Bulow | |
| 10,319,390 | B2 | 6/2019 | Soleymani | |
| 10,374,564 | B2 | 8/2019 | Smith | |
| 2005/0288923 | A1 | 12/2005 | Kok | |
| 2008/0069364 | A1 | 3/2008 | Itou | |
| 2008/0167870 | A1 * | 7/2008 | Hetherington | G10L 21/02 381/94.1 |
| 2010/0161324 | A1 * | 6/2010 | Tanaka | G10K 11/178 704/226 |
| 2016/0027451 | A1 | 1/2016 | Solbach | |
| 2019/0013036 | A1 | 1/2019 | Graf | |
| 2019/0206420 | A1 | 7/2019 | Kandade Rajan | |
| 2020/0204915 | A1 | 6/2020 | Olsson | |
| 2020/0219524 | A1 | 7/2020 | Braun | |

FOREIGN PATENT DOCUMENTS

| | | | |
|---|---|---|---|
| CN | 101763853 | A | 6/2010 |
| CN | 102117618 | A | 9/2012 |
| CN | 102750947 | A | 10/2012 |
| CN | 103109320 | A | 5/2013 |
| CN | 106486131 | A | 3/2017 |
| EP | 2023342 | A1 | 2/2009 |
| EP | 2202730 | B1 | 10/2011 |

OTHER PUBLICATIONS

Brandt et al., ("Automatic detection of hum in audio signals." Journal of the Audio Engineering Society 62.9 (2014): 584-595) (Year: 2014).*

Luczynski, ("Primary study on removing mains hum from recordings by active tone cancellation algorithms." Audio Engineering Society Convention 146. Audio Engineering Society, 2019.) (Year: 2019).*

Brandt, M., & Bitzer, J. "Automatic Detection of Hum in Audio Signals," Journal of the Audio Engineering Society, 2014, 62(9), 584-595.

Brandt, M., & Bitzer, J., "Hum Removal Filters: Overview and Analysis." AES 132nd convention, Apr. 26-29, 2012 Budapest, Hungary.

PCT/EP2021/071148, EPO as IPEA, "International Preliminary Report on Patentability," mailed Feb. 9, 2023, 8 pages.

PCT/EP2021/071148, EPO as ISA, "International Search Report and Written Opinion," mailed Oct. 22, 2021, 13 pages.

Davida Rochman, "Feedback: Fact and Fiction," Aug. 4, 2011, <https://www.shure.com/en-us/performance-production/louder/feedback-fact-and-fiction#:~:text="Whistles"%20and%20"screeches",the%20next%20frequency%20begins%20ringing.>.

Guillermo Garcia, "Automatic denoising for musical audio restoration,"Ph.D. Dissertation for Stanford University, Sep. 2009, 123 pages, UMI 3382727, ProQuest LLC, Ann Arbor, MI, US.

Hartmut R. Pfitzinger, "Removing Hum From Spoken Language Resources," 2000.

Jon Jacobi, "How to get rid of hum and other noises from your audio, video systems," retrieved on Dec. 6, 2022, <https://www.techhive.com/article/3063590/how-to-get-rid-of-hum-and-eliminate-other-noises-from-your-audio-and-video-systems.html>.

Qi, Y. and Hillman, R. E., "Temporal and spectral estimations of harmonics-to-noise ratio in human voice signals," 1997, Journal of the Acoustical Society of America 102, 537-543.

Stylianou, Y., "Modeling Speech Based on Harmonic Plus Noise Models," In: Chollet, G., Esposito, A., Faundez-Zanuy, M., Marinaro, M. (eds) Nonlinear Speech Modeling and Applications. NN 2004. Lecture Notes in Computer Science, vol. 3445. Springer, Berlin, Heidelberg.

Yeh, C., "Multiple Fundamental Frequency Estimation of Polyphonic Recordings," Ph.D. thesis, 2008, University Paris 6.

Abe et al. "Design Criteria for the Quadratically Interpolated FFT Method (I): Bias Due to Interpolation" STAN-M 114; CCRMA, Department of Music, Stanford University: Stanford, CA, USA, Oct. 13, 2004, pp. 1-13, 13 pages.

* cited by examiner

HUM NOISE DETECTION AND REMOVAL FOR SPEECH AND MUSIC RECORDINGS

CROSS-REFERENCE TO RELATED APPLICATIONS

This application is the U.S. national stage entry of International Patent Application No. PCT/EP2021/071148 (reference D20073WO01), which claims priority of the following priority applications: ES application P202030814 (reference D20073ES), filed 30 Jul. 2020, U.S. provisional application 63/088,827 (reference: D20073USP1), filed 7 Oct. 2020 and U.S. provisional application 63/223,252 (reference: D20073USP2), filed 19 Jul. 2021, which are hereby incorporated by reference.

TECHNICAL FIELD

The present disclosure relates to methods and apparatus for processing audio data. The present disclosure further describes techniques for de-hum processing (e.g., hum noise detection and/or removal) for audio recordings, including speech and music recordings. These techniques may be applied, for example, to (cloud-based) streaming services, online processing, and post-processing of music and speech recordings.

BACKGROUND

Hum noise is often present in audio recordings. It could originate from the ground loop, AC line noise, cables, RF interference, computer motherboards, microphone feedback, home appliances such as refrigerators, neon light buzz, etc. A software solution for handling hum noise is usually necessary as recording conditions cannot always be assured.

Hum noise usually appears very similar to a group of fixed frequency "tones". The hum tones often space with a regular frequency interval, resulting in harmonic sounds. However, the "harmonics" may appear only in parts of the frequency bands and the fundamental tone (e.g., perceptually dominant tone) might not correspond to its fundamental frequency.

To enhance a speech/music recordings containing hum noise, it is critical to identify the perceptually dominant hum tones and to distinguish them from speech/music harmonics. Generally, there is need for improved techniques for hum noise detection and/or removal.

SUMMARY

In view of the above, the present disclosure provides methods of processing audio data as well as corresponding apparatus, computer programs, and computer-readable storage media, having the features of the respective independent claims.

According to an aspect of the disclosure, a method of processing audio data is provided. The method may be a method of detecting and/or removing hum noise. The audio data may relate to an audio file, a video file including audio, an audio signal, or a video signal including audio, for example. The audio data may include a plurality of frames. The frames may be overlapping frames. As such, the audio data may include (or represent) a sequence of (overlapping) frames. The method may include classifying frames of the audio data as either content frames or noise frames, using one or more content activity detectors. Content frames may be frames of the audio data that contain content, such as music and/or speech. As such, content frames may be frames that are perceptually dominated by content. Noise frames may be frames of the audio data that are perceptually dominated by noise (e.g., frames that do not contain content, frames that are likely to not contain content, or frames that predominantly contain noise). Classification of frames may involve comparing one or more likelihoods for respective content types to respective thresholds. The likelihoods may have been determined by the one or more content activity detectors. The content activity detectors may also be referred to as content classifiers. Further, the content activity detectors may be implemented by appropriately trained deep neural networks. The method may further include determining a noise spectrum from one or more frames of the audio data that are classified as noise frames. The noise spectrum may be determined based on frequency spectra of the one or more frames that are classified as noise frames. The determined noise spectrum may be referred to as an aggregated noise spectrum or key noise spectrum. The method may further include determining one or more hum noise frequencies based on the determined noise spectrum. The method may further include generating an estimated hum noise signal based on the one or more hum noise frequencies. The method may yet further include removing hum noise from at least one frame of the audio data based on the estimated hum noise signal.

Configured as described above, the proposed method distinguishes between noise frames and content frames. Only noise frames are then used for determining the noise spectrum (e.g., key noise spectrum), and based thereon, the hum noise frequencies. This allows for robust and accurate estimation of the hum noise frequencies, and accordingly, for efficient hum noise removal. High accuracy of the determined hum noise frequencies drastically reduces the likelihood of perceptible artifacts in the denoised output audio data.

In some embodiments, the one or more hum noise frequencies may be determined as outlier peaks of the noise spectrum. The peaks of the noise spectrum may be determined/decided to relate to outlier peaks if their magnitude is above a frequency-dependent threshold. This allows for efficient and automated detection of hum noise frequencies and further provides for an easily implementable control parameter (e.g., the threshold) controlling aggressiveness of hum noise removal. Moreover, using such frequency-dependent threshold results in an easily implementable hum noise removal, but at the same time, by appropriate choice of the frequency-dependent threshold, allows for automation of more advanced removal processes, tailored to specific applications.

In some embodiments, determining the one of more hum noise frequencies may involve determining a smoothed envelope of the noise spectrum. The smoothed envelope may be the cepstral envelope, for example. Alternatively, the smoothed envelope may be determined based on a moving average across frequency. In general, the smoothed envelope may indicate expected values of the noise spectrum. Determining the one of more hum noise frequencies may further involve determining the one or more hum noise frequencies as outlier peaks of the noise spectrum compared to the smoothed envelope.

In some embodiments, the smoothed envelope may be determined on a perceptually warped scale. The perceptually warped scale may be the Mel scale or the Bark scale, for example. This allows better handling of close hum tones in low frequencies and compensating possible over-estimation that might occur when the envelope is calculated on a linear scale.

In some embodiments, a peak of the noise spectrum may be decided to be an outlier peak if its magnitude is above the smoothed envelope by more than a threshold. The threshold may be a magnitude threshold, for example.

In some embodiments, the threshold may be a frequency-dependent threshold. The frequency-dependent (magnitude) threshold may be lower for lower frequencies. For example, the frequency-dependent (magnitude) threshold may be defined to have a first value (e.g., 3 dB) for a low-frequency band and a second value (e.g., 6 dB) greater than the first value for a high-frequency band. Thereby, the thresholds adapt to the envelope estimation bias and the resolution limit resulting from underlying sinusoidal components that are close in frequency.

In some embodiments, the noise spectrum may be determined based on an average of frequency spectra of the one or more frames that are classified as noise frames. In this case, the noise spectrum would be the mean noise spectrum of the one or more frames that are classified as noise frames.

In some embodiments, the noise spectrum may be determined based on a frequency spectrum that includes the largest energy among the frequency spectra of the one of the one or more frames that are classified as noise frames. For example, the noise spectrum may be based on a weighted sum of the averaged frequency spectrum (e.g., mean noise spectrum) and the frequency spectrum that includes the largest energy. Thereby, a noise spectrum can be obtained that has less smoothed frequency peaks and therefore allows for more accurate detection of hum noise frequencies.

In some embodiments, generating the estimated hum noise signal may involve synthesizing a respective hum tone for each of the one or more hum noise frequencies. The synthesized hum tones may be sinusoidal tones, for example. The estimated hum noise signal may be the sum (superposition) of the individual hum tones.

In some embodiments, generating the estimated hum noise signal may involve, for each hum noise frequency, determining a respective hum noise phase based on the respective hum noise frequency and the audio data in the at least one frame. The hum noise phases determined in this manner may be referred to as instantaneous hum noise phases. The hum noise phases may be determined using a Least Squares method, for example. Each hum noise frequency may have a respective associated hum noise phase. Generating the estimated hum noise signal may further involve synthesizing a respective hum tone for each of the one or more hum noise frequencies based on the hum noise frequency and the respective hum noise phase.

In some embodiments, generating the estimated hum noise signal may involve, for each hum noise frequency, determining a respective (instantaneous) hum noise amplitude based on the respective hum noise frequency and the audio data in the at least one frame. Generating the estimated hum noise signal may further involve, for each hum noise frequency, determining a respective mean hum noise amplitude based on the noise spectrum. Generating the estimated hum noise signal may yet further involve synthesizing the respective hum tone for each of the one or more hum noise frequencies based on the respective hum noise frequency, the respective hum noise phase, and a smaller one of the respective hum noise amplitude and the respective mean hum noise amplitude. By choosing the smaller one of the instantaneous hum noise amplitude and the mean hum amplitude, over-aggressive hum noise removal that might result in audible artifacts, such as the introduction of extra hum noise, can be avoided. Moreover, the proposed technique can be applied to all frames alike, regardless of whether they are content frames (e.g., speech, music) or noise frames.

In some embodiments, when the at least one frame is classified as a noise frame, generating the estimated hum noise signal may involve, for each hum noise frequency, determining a respective hum noise amplitude based on the respective hum noise frequency and the audio data in the at least one frame. The hum noise amplitudes determined in this manner may be referred to as instantaneous hum noise amplitudes. The hum noise amplitudes may be determined using a Least Squares method, for example. Each hum noise frequency may have a respective associated hum noise amplitude. Generating the estimated hum noise signal in this case may further involve synthesizing the respective hum tone for each of the one or more hum noise frequencies based on the respective hum noise frequency, the respective (instantaneous) hum noise phase, and the respective (instantaneous) hum noise amplitude.

In some embodiments, when the at least one frame is classified as a content frame, generating the estimated hum noise signal may involve, for each hum noise frequency, determining a respective mean hum noise amplitude based on the noise spectrum. Each hum noise frequency may have a respective associated mean hum noise amplitude. Generating the estimated hum noise signal in this case may further involve synthesizing the respective hum tone for each of the one or more hum noise frequencies based on the respective hum noise frequency, the respective (instantaneous) hum noise phase, and the respective mean hum noise amplitude. Alternatively, instead of using the mean hum noise amplitude, the instantaneous hum noise amplitude of a preceding (e.g., directly preceding) noise frame may be used.

In some embodiments, generating the estimated hum noise signal may involve, for each hum noise frequency, determining a respective mean hum noise amplitude based on the noise spectrum. Each hum noise frequency may have a respective associated mean hum noise amplitude. Generating the estimated hum noise signal may further involve synthesizing the respective hum tone for each of the one or more hum noise frequencies based on the respective hum noise frequency and the respective mean hum noise amplitude.

In some embodiments, removing hum noise from the at least one frame may involve subtracting the estimated hum noise signal from the at least one frame.

In some embodiments, the noise spectrum may be determined based on frequency spectra of all frames of the audio data that are classified as noise frames. This presumes that all frames of the audio data are simultaneously available and may be referred to as offline processing.

In some embodiments, the method may include sequentially receiving and processing the frames of the audio data. The method may further include, for a current frame, if the current frame is classified as a noise frame, updating the noise spectrum based on a frequency spectrum of the current frame. This scenario may be referred to as online processing. For online processing, the method may further include determining one or more updated hum noise frequencies from the updated noise spectrum, generating an updated estimated hum noise signal based on the one or more updated hum noise frequencies, and/or removing hum noise from the current frame based on the updated estimated hum noise signal.

In some embodiments, the noise spectrum may be determined from a plurality of frames that are classified as noise frames. The method may further include determining a variance over time of the one or more hum noise frequencies based on frequency spectra of the plurality of frames that are classified as noise frames. The method may yet further include, depending on the variance over time, applying band pass filtering to the frames of the audio data. Therein, the band pass filter may be designed such that the stop bands include the one or more hum noise frequencies. Band pass filtering may be applied if the variance over time indicates non-stationary hum noise, i.e., if the hum noise frequencies are modulated with more than a certain rate, for example. Presence of non-stationary hum noise may be decided, and band pass filtering may be applied accordingly, if the variance over time exceeds a certain threshold for the variance over time. This allows to avoid audible artifacts, such as the introduction of extra hum noise, that might result from hum noise removal when applied to (highly) non-stationary hum noise.

In some embodiments, widths of the stop bands may be determined based on variances over time of respective hum noise frequencies.

In some embodiments, the method may include, for at least one of the one or more hum noise frequencies, determining whether the at least one hum noise frequency is present as a peak in the frequency spectra of all frames of the audio data. The method may further include disregarding the at least one hum noise frequency when removing the hum noise if the at least one hum noise frequency is not present as a peak in the frequency spectra of all frames of the audio data. In other words, hum noise frequencies determined from the noise spectrum may only be considered for hum noise removal if they are present throughout the entire audio data, for example from the first frame to the last. Thereby, content-related harmonics (such as those in music, for example) can be distinguished from hum noise, assuming that only hum noise is present throughout an entire audio recording.

According to another aspect, a computer program is provided. The computer program may include instructions that, when executed by a processor (e.g., computer processor, server processor), cause the processor to carry out all steps of the methods described throughout the disclosure.

According to another aspect, a computer-readable storage medium is provided. The computer-readable storage medium may store the aforementioned computer program.

According to yet another aspect an apparatus including a processor and a memory coupled to the processor is provided. The processor may be adapted to carry out all steps of the methods described throughout the disclosure. This apparatus may relate to a server (e.g., cloud-based server) or to a system of servers (e.g., system of cloud-based servers), for example.

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) (and, e.g., their steps) are understood to likewise apply to the corresponding apparatus (and, e.g., their blocks, stages, units), and vice versa.

BRIEF DESCRIPTION OF DRAWINGS

Example embodiments of the disclosure are explained below with reference to the accompanying drawings, wherein.

DETAILED DESCRIPTION

Figure 1:
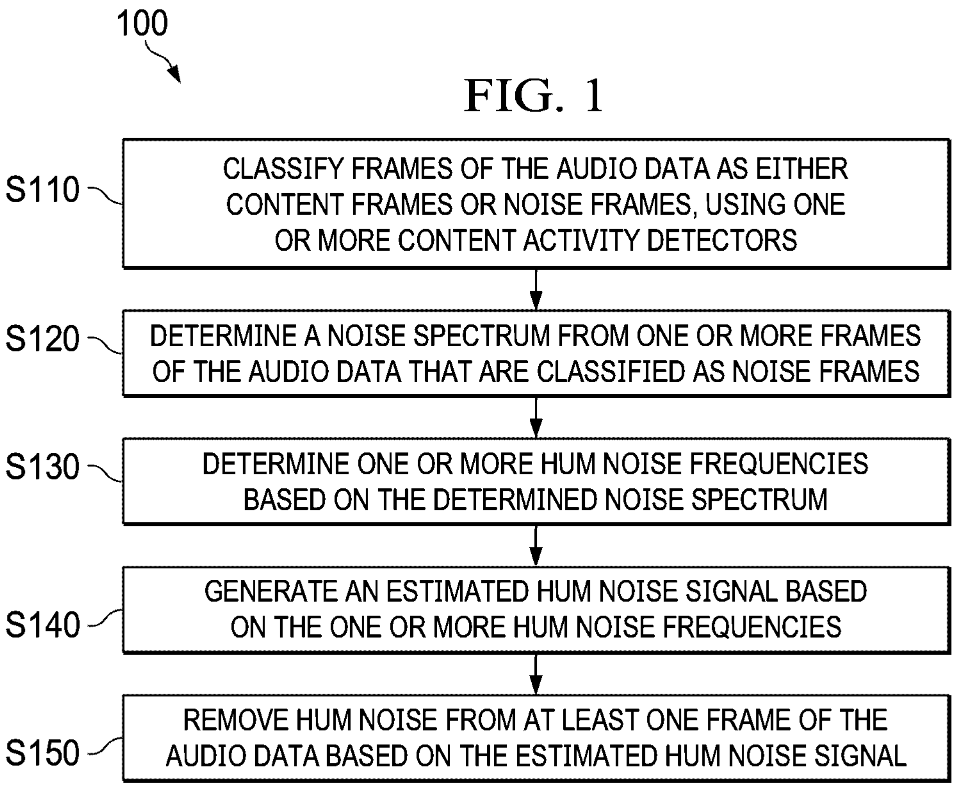
FIG. 1 is a flowchart illustrating an example of a method according to embodiments of the disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In one possible approach for dealing with hum noise, hum tones are detected based on the amount of fluctuation of power over time in each frequency bin. The hum frequencies are then refined through an adaptive notch filtering algorithm. However, it is difficult for this approach, for instance, to safely exclude a sustained bass tone from detection as hum noise.

Also, several common filters may be used for hum removal, but it has been found that quality of audio processed in this manner leaves room for improvement. It is moreover known that simple filters may introduce phase distortions and/or unavoidably suppress content components, and therefore result in artifacts that may become unpleasant especially when hum noise interferes with speech harmonics and/or music harmonics.

In another possible approach for dealing with hum noise, a FIR bandpass filter is designed which reduces the amplitudes of the first five harmonics of a 50 Hz hum by at least 40 dB. Applying a fixed threshold of 40 dB to the short-term amplitudes of FIR bandpass filtered speech signals allows for accumulating speech and non-speech signal passages. Based on non-speech signal passages, mean spectral energy is derived and either simple peak picking or fundamental-frequency estimation is used for detecting hum tones. The detected hum tones are then removed from the original signal. Also in this case, quality of the processed audio leaves room for improvement as the fixed thresholding may suppress desired non-noise content (e.g., speech or musical content spectrally similar to the rudimentary noise estimate).

This disclosure describes a method for automatic detection and subsequent removal of hum noise for speech and music recordings, for example by sinusoid modeling of hum noise.

The proposed method may have one or more of the following three key aspects:

Use of content activity detection (CAD) for identifying noise (non-content, e.g., non-speech and non-music) frames in which hum noise is analyzed Frequency-dependent and/or perceptually relevant detection of hum tones, possibly without assumption of harmonic relation Adaptive use of global mean hum amplitudes and local instantaneous estimates of amplitudes Example embodiments of the present disclosure will now be described in more detail.

FIG. 1 is a flowchart illustrating an example of a method 100 of processing audio data according to embodiments of the disclosure. Method 100 may be a method of hum noise detection and/or hum noise removal in audio recordings (or files including audio in general) represented by the audio data. In general, the audio data may relate to an audio file, a video file including audio, an audio signal, or a video signal including audio, for example.

The audio data comprises a plurality of frames. For example, the audio data may have been generated by carrying out a short-time frame analysis. The short-time frame analysis may use a window (window function) and/or overlap between frames. As such, the audio data may comprise (or represent) a sequence of (overlapping) frames. For example, a Hann window (e.g., an 85 ms Hann window) may be used. Further, a 50% overlap may be used. Of course, other combinations of window functions, window length, and/or overlap may be selected as well, in accordance with requirements, for example in accordance with one or more minimum frequencies present or expected in the recorded content.

At step S110 of method 100, frames of the audio data are classified as either content frames or noise frames. This may use one or more content activity detectors (CADs) or content classifiers. Content frames may be frames of the audio data that contain content, such as music and/or speech. Noise frames may be frames of the audio data that do not contain content.

For example, existing content activity detectors can be used to estimate the instantaneous probability of different types of content, such as speech and music. A frame can then be is classified as noise if neither the music nor speech probability is higher than its respective thresholds. In general, classification of frames may involve comparing one or more probabilities (likelihoods) for respective content types to respective thresholds. The probabilities may be determined by the one or more content activity detectors. It is understood that the content activity detectors may be implemented by appropriately trained deep neural networks, for example.

At step S120, a noise spectrum is determined from one or more frames of the audio data that are classified as noise frames. Specifically, the noise spectrum may be determined (e.g., estimated) based on frequency spectra of the one or more frames that are classified as noise frames. In other words, the spectra of noise frames may be accumulated to estimate the noise spectrum. The noise spectrum may thus be referred to as an aggregated noise spectrum or key noise spectrum (KNS). In some implementations, the noise spectrum (e.g., key noise spectrum) may be determined in response to a threshold number of frames having been classified as noise frames, based on the threshold number of frames that have been classified as noise frames. For example, the method may first accumulate a threshold number of noise frames, and determine the noise spectrum only after the threshold number of noise frames is available. In one implementation, the noise spectrum (e.g., key noise spectrum) may be determined (e.g., estimated) based on an average of frequency spectra of the one or more frames that are classified as noise frames. Specifically, the noise spectrum may be determined as the average of all the frequency spectra considered (i.e., the frequency spectra of all considered noise frames). The resulting noise spectrum may be the mean noise spectrum (MNS) of the considered noise frames (i.e., the one or more frames that are classified as noise frames at step S110). The MNS can be updated at each noise frame and therefore be used in an online adaptive manner. In case that the initial frames of the audio data are not noise for an online scenario, a frequency-dependent CAD combined with steady tone tracking can be used until a noise frame is available. In this case, in some implementations, the mean noise spectrum may be determined in response to a threshold number of frames having been classified as noise frames, based on the threshold number of frames that have been classified as noise frames. For example, the method may first accumulate a threshold number of noise frames, and determine the mean noise spectrum only after the threshold number of noise frames is available.

In another implementation, the noise spectrum (e.g., key noise spectrum) may be determined based on a frequency spectrum that includes the largest energy among the frequency spectra of the one of the one or more frames that are classified as noise frames. For example, the noise spectrum may be based on (e.g., determined as) a weighted sum of the averaged frequency spectrum (e.g., mean noise spectrum) and the frequency spectrum that includes the largest energy. In other words, the noise spectrum (key noise spectrum) may be determined as a weighted sum of the MNS with the strongest noise spectrum. This gives a "spikier" spectrum compared to the MNS because the MNS tends to smooth out hum tone peaks when hum tones are slightly modulated. The resulting noise spectrum may be a weighted noise spectrum (WNS) of the considered noise frames (i.e., the one or more frames that are classified as noise frames at step S110). The weights for the weighted sum may be chosen as control parameters for the desired "spikiness" of the noise spectrum.

Figure 2:
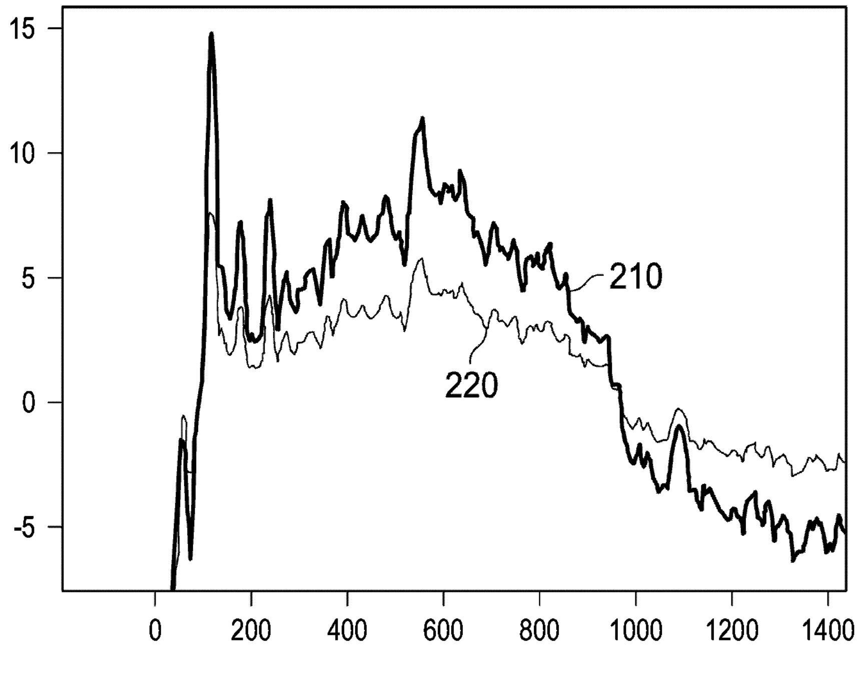
FIG. 2 is a diagram illustrating examples of noise spectra according to embodiments of the disclosure.

FIG. 2 shows an example of a comparison between the MNS, curve 210, and the WNS, curve 220. As noted above, the WNS is somewhat less smoothed than the MNS.

At step S130 of method 100, one or more hum noise frequencies are determined based on the determined noise spectrum. For example, the one or more hum noise frequencies may be determined as outlier peaks of the noise spectrum. Peaks of the noise spectrum may be detected/identified based on counts at respective frequency bins (e.g., based on respective indications of (relative) energy at each of the frequency bins of the noise spectrum). The detected peaks of the noise spectrum may then be determined/decided to relate to outlier peaks if their magnitude is above a threshold, such as a frequency-dependent threshold, for example.

Figure 3:
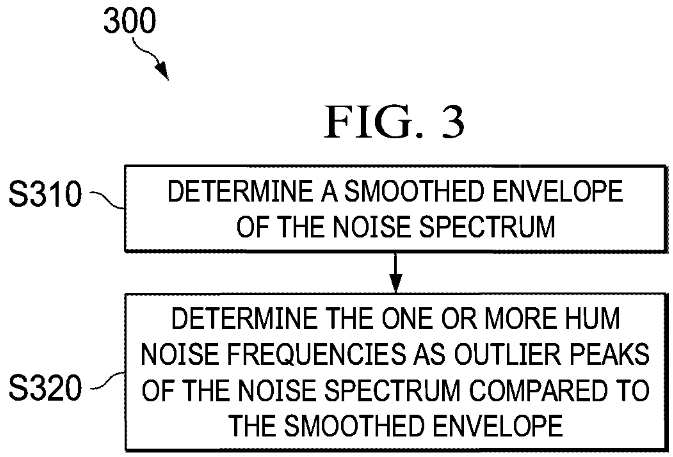
FIG. 3 is a flowchart illustrating an example of an implementation of a step of the method of FIG. 1, according to embodiments of the disclosure.

As noted above, the detection of hum tones is carried out based on a given noise spectrum (e.g., KNS). One implementation 300 of step S130 is schematically illustrated in the flowchart of FIG. 3. Accordingly, determining the one of more hum noise frequencies at step S130 may involve steps S310 and S320 described below.

At step S310, a smoothed envelope of the noise spectrum is determined. The smoothed envelope may be the cepstral envelope, for example. The cepstral envelope can be said to represent the expected magnitude of the noise spectrum. It is a frequency-dependent smooth curve passing through the expected values at each frequency bin. Alternatively, the smoothed envelope may be determined based on a moving average across frequency. In general, the smoothed envelope may indicate expected values of the noise spectrum. The outlier components can then be selected as possible hum tones.

In one possible implementation, the smoothed envelope may be determined on a perceptually warped scale, such as the Mel scale or the Bark scale, for example. Analysis (e.g., cepstral analysis) on a perceptually warped scale (e.g., Mel, bark, etc.) can be used to adapt more rapidly in the low frequency regions (therefore more slowly in high frequency regions). This allows better handling close hum tones in low frequencies and compensating possible over-estimation that might occur when calculated on a linear scale. Such envelope also tends to be smooth in high frequencies where the actual noise floor does not very rapidly change between frequency bins.

At step S320, the one or more hum noise frequencies are determined as outlier peaks of the noise spectrum compared to the smoothed envelope. For instance, a peak of the noise spectrum may be decided to be an outlier peak if its magnitude is above the smoothed envelope by more than a threshold. This threshold may be a magnitude threshold, for example. Specifically, the outliers of the noise spectrum (e.g., KNS) may be selected for those peaks with a number of magnitudes larger than a threshold from the cepstral envelope.

The aforementioned threshold may be a frequency-dependent threshold. Thus, in one implementation, different thresholds may be set for different frequency bands. Therein, the frequency-dependent (magnitude) threshold may be lower for lower frequencies (lower frequency bands). For example, the frequency-dependent (magnitude) threshold may be defined to have a first value (e.g., 3 dB) for a low-frequency band (or low-frequency bands) and a second value (e.g., 6 dB) greater than the first value for a high-frequency band (or high-frequency bands). The frequency boundary between the low-frequency band(s) and the high-frequency band(s) may be set at 4 kHz, for example. In another example, the threshold can be defined as a smooth transfer function across frequency.

Figure 4:
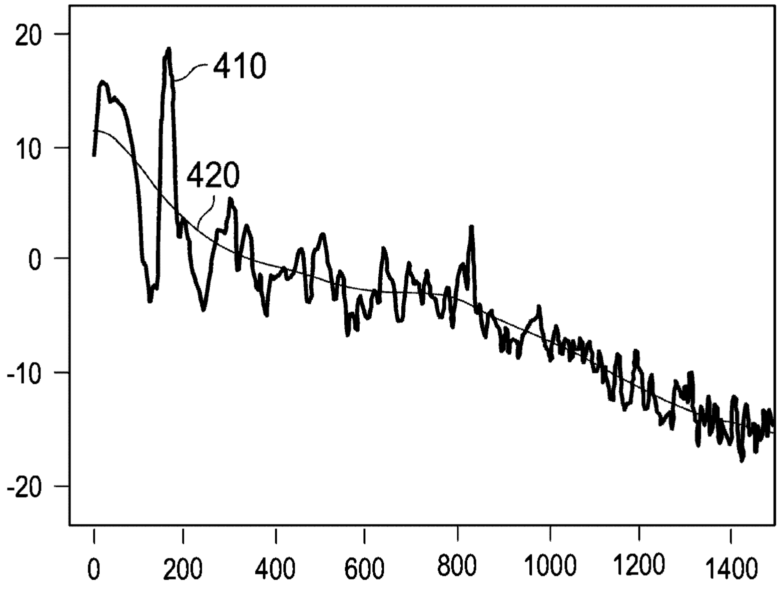
FIG. 4 is a diagram illustrating an example of a smoothed envelope for the noise spectrum, according to embodiments of the disclosure.

FIG. 4 shows an example of the noise spectrum 410 compared to the cepstral envelope 420. Peaks of the noise spectrum 410 that are sufficiently above the cepstral envelope 420 may be detected as outlier peaks, and thus as hum tones. If desired or necessary, the hum tone frequencies can be refined using the Quadratically Interpolated Fast Fourier Transform QIFFT method.

Once the hum tone frequencies are selected, their temporal amplitudes (e.g., mean hum amplitudes, MHA) can be derived from the noise spectrum (e.g., KNS, MNS, WNS) at the detected frequencies. For example, the mean hum amplitude may be determined based on the noise spectrum (e.g., KNS), such as by determining peak values for respective hum tone frequencies in the noise spectrum.

Returning to FIG. 1, at step S140 of method 100, an estimated hum noise signal is generated based on the one or more hum noise frequencies. This may involve synthesizing a respective hum tone (e.g., sinusoidal tone) for each of the one or more hum noise frequencies. The estimated hum noise signal may be the sum (superposition) of the hum tones. In this sense, the hum tones are modeled an additive model: a sum of sinusoids.

Given the hum tone frequencies, the instantaneous amplitudes and phases can be estimated using the Least Square method at each short time frame to synthesize the respective sinusoids.

- If the short-time frame is noise, the instantaneous amplitudes and instantaneous phases can be used for sinusoid synthesis.
- If the short-time frame contains mixed content (e.g., speech and music), the MHA and the instantaneous phases can be used for sinusoid synthesis. Alternatively, the instantaneous amplitude from an earlier frame and the instantaneous phase for the current frame could also be used for sinusoid synthesis.

Alternatively, the MHA can also be used for all frame types (e.g., for both noise frames and frames containing content) as a less aggressive hum removal option. As a further refinement, the smaller one of the instantaneous amplitude and the MHA can be used for sinusoid synthesis.

FIG. 5 to FIG. 9 show non-limiting examples of possible implementations of step S140 for generating an estimated hum noise signal based on the one or more hum noise frequencies, in line with the above.

Figure 5:
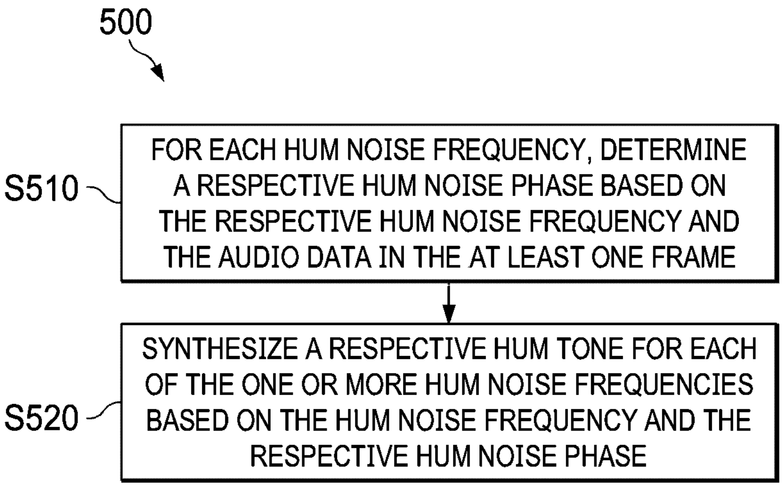
FIG. 5 to FIG. 9 are flowcharts illustrating examples of implementations of another step of the method of FIG. 1, according to embodiments of the disclosure.

Method 500 illustrated in FIG. 5 includes steps S510 and S520 and may be applied to all frames regardless of content type.

At step S510, for each hum noise frequency, a respective hum noise phase is determined based on the respective hum noise frequency and the audio data in the at least one frame. Accordingly, each hum noise frequency may have a respective associated hum noise phase. The hum noise phases may be determined using a Least Squares method, for example, by fitting to the audio signal in the at least one frame. Further, the hum noise phases determined in this manner may be referred to as instantaneous hum noise phases, as indicated above. It is understood the instantaneous phases and the instantaneous amplitudes may be jointly determined in some implementations (e.g., by the Least Squares method), but that separate (independent) determination of instantaneous phases and instantaneous amplitudes is feasible as well.

At step S520, a respective hum tone is synthesized for each of the one or more hum noise frequencies based on the hum noise frequency and the respective (instantaneous) hum noise phase. As will be described in more detail below, the synthesizing may be further based on a respective hum noise amplitude for each of the hum noise frequencies. Feasible hum noise amplitudes include the instantaneous hum noise amplitude, the MHA, or functions of either or both.

Figure 6:
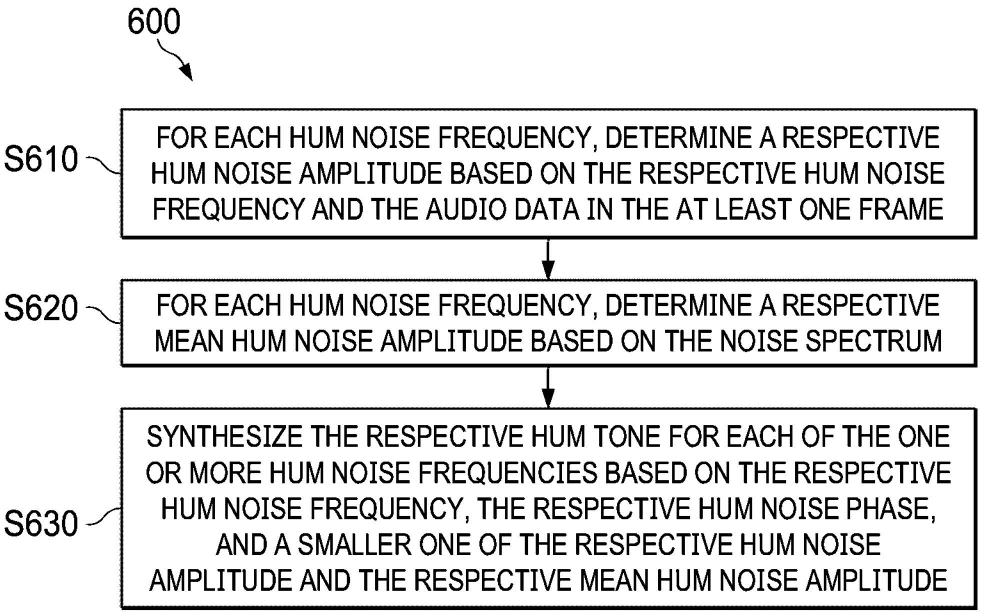

Method 600 illustrated in FIG. 6 includes steps S610, S620, and S630 and may be applied to all frames regardless of content type.

At step S610, for each hum noise frequency, a respective hum noise amplitude is determined based on the respective hum noise frequency and the audio data in the at least one frame. Accordingly, each hum noise frequency may have a respective associated hum noise amplitude. The hum noise amplitudes may be determined using a Least Squares method, for example, by fitting to the audio signal in the at least one frame. Further, the hum noise amplitudes determined in this manner may be referred to as instantaneous hum noise amplitudes, as indicated above. It is understood the instantaneous phases and the instantaneous amplitudes may be jointly determined in some implementations (e.g., by the Least Squares method), but that separate (independent)

determination of instantaneous phases and instantaneous amplitudes is feasible as well.

At step S620, for each hum noise frequency, a respective mean hum noise amplitude is determined based on the noise spectrum. Accordingly, each hum noise frequency may have a respective associated mean hum noise amplitude. The determination may be done in the manner described above, for example. Importantly, the mean hum altitude is determined based on the noise spectrum (e.g., KNS), independently of the audio data in the at least one frame. As such, the mean hum amplitude is universal for all frames (apart from possible adaptations or updates in an online scenario, as described below).

Then, at step S630 the respective hum tone for each of the one or more hum noise frequencies is synthesized based on the respective hum noise frequency, the respective hum noise phase, and a smaller one of the respective (instantaneous) hum noise amplitude and the respective mean hum noise amplitude. By choosing the smaller one of the instantaneous hum noise amplitude and the MHA, over-aggressive hum noise removal that might result in audible artifacts (such as the introduction of extra hum noise, for example) can be avoided, and the proposed technique can be applied to all frames alike, regardless of whether they are content frames (e.g., speech, music) or noise frames.

Alternatively, if the MHA should not be available, the instantaneous hum noise amplitude of a preceding (e.g., directly preceding) noise frame may be used instead of the mean hum noise amplitude in some implementations.

Figure 7:
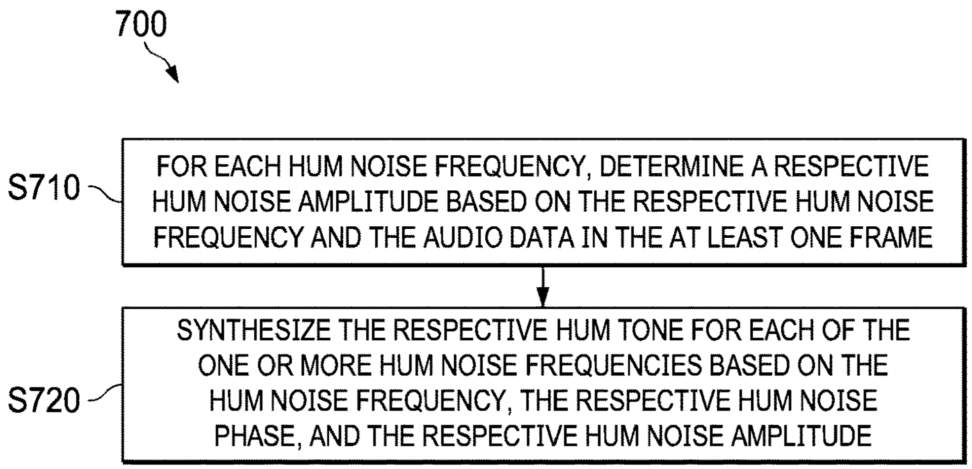

Method 700 illustrated in FIG. 7 includes steps S710 and S720 and is particularly suitable for noise frames.

At step S710, for each hum noise frequency, a respective (instantaneous) hum noise amplitude is determined based on the respective hum noise frequency and the audio data in the at least one frame. This may be done in the same manner as described above, for example in relation to step S610 of method 600.

At step S720, the respective hum tone for each of the one or more hum noise frequencies is synthesized based on the respective hum noise frequency, the respective (instantaneous) hum noise phase, and the respective (instantaneous) hum noise amplitude.

Figure 8:
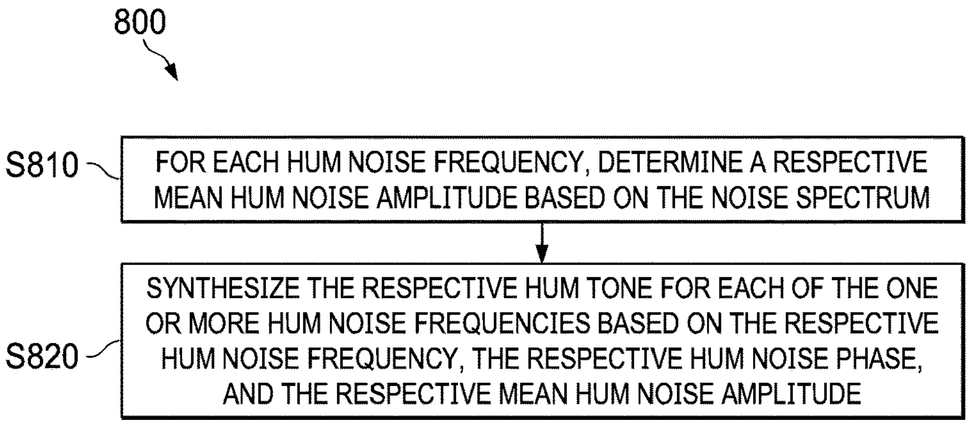

Method 800 illustrated in FIG. 8 includes steps S810 and S820 and is particularly suitable for content frames (e.g., speech or music frames).

At step S810, for each hum noise frequency, a respective mean hum noise amplitude is determined based on the noise spectrum. This may be done in the manner described above, for example.

At step S820, the respective hum tone for each of the one or more hum noise frequencies is synthesized based on the respective hum noise frequency, the respective hum noise phase, and the respective mean hum noise amplitude.

Figure 9:
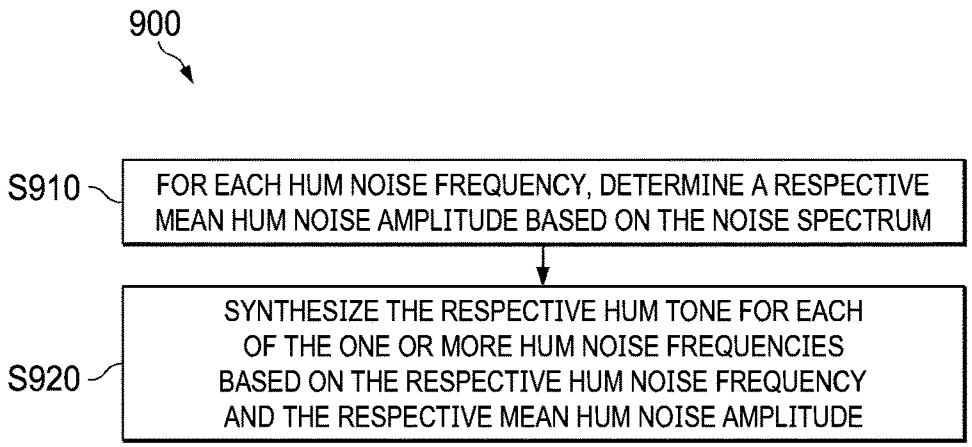

Method 900 illustrated in FIG. 9 includes steps S910 and S920 and may be applied to all frames regardless of content type.

At step S910, for each hum noise frequency, a respective mean hum noise amplitude is determined based on the noise spectrum.

At step S920, the respective hum tone for each of the one or more hum noise frequencies is synthesized based on the respective hum noise frequency and the respective mean hum noise amplitude. As has been described above, the synthesizing may be further based on a respective (instantaneous) hum noise phase for each of the hum noise frequencies.

Returning to FIG. 1, at step S150 of method 100, hum noise is removed from at least one frame of the audio data based on the estimated hum noise signal. This may involve subtracting the estimated hum noise signal generated at step S140 from the at least one frame. For example, for each short-time frame under consideration (e.g., each short-time frame of the audio data), the synthesized sinusoids (e.g., one or more sinusoids based one of more of the identified hum frequencies) may be subtracted from the input signal as the final hum removal process.

Several techniques may be used for verifying hum noise removal. Examples of these techniques will be described in the following.

In order to handle inaccurate estimation of hum tones, a simple check can be based on comparing the energy before and after de-hum processing. If the energy increases by a pre-defined amount (or more) with respect to the synthesized hum tones, it is very possible that the time-domain subtraction is adding hum tones due to inaccurate estimation. In such case, the algorithm will bypass the processed output (e.g., if the energy after de-hum processing exceeds the energy before processing for a respective portion of the audio data by a threshold amount, de-hum processing for the respective portion of the audio data is omitted in the final output).

Further, modulation of the hum noise frequencies over time that might affect quality of hum noise removal may be detected by considering a variance of the detected hum noise frequencies over time. Assuming that the noise spectrum (e.g., KNS) is determined from a plurality of noise frames (i.e., frames that are classified as noise frames), method 100 may additionally include determining a variance over time of the one or more hum noise frequencies based on frequency spectra of the plurality of noise frames. Depending on the variance over time, band pass filtering may be applied to the frames of the audio data, instead of the hum noise removal of step S150. For example, band-pass filtering may be applied for large variance over time (e.g., for a variance greater than a threshold), and the hum noise removal of step S150 may be applied for small variance over time (e.g., for a variance smaller than the threshold).

Put differently, band pass filtering may be applied if the variance over time indicates non-stationary hum noise (or non-stationary noise beyond a threshold for acceptable non-stationarity), i.e., if the hum noise frequencies are modulated with more than a certain rate, for example. Presence of non-stationary hum noise may be decided, and band pass filtering may be applied accordingly, if the variance over time exceeds a certain threshold for the variance over time.

The band pass filter that is used for this purpose may be designed such that the stop bands include the one or more hum noise frequencies. The widths of the stop bands may be determined based on variances over time of respective hum noise frequencies.

It is understood that the hum noise removal of step S150 and band-pass filtering may be applied in a hybrid manner. That is, band pass filtering may be applied for those hum noise frequencies that display a large variance over time, with stop bands including these hum noise frequencies, and hum noise removal as per step S150 may be applied for the remaining hum noise frequencies.

Especially (but not exclusively) music recordings may include intended tones that might be confused with hum noise, such as bass guitars, etc. In such cases, actual hum noise may be distinguished from intended tones by checking whether the frequencies under consideration are present throughout the whole recording, or at least a large portion thereof. Accordingly, method 100 may further include, for at least one of the detected one or more hum noise frequencies, determining whether the at least one hum noise frequency is present as a peak in the frequency spectra of a majority of frames of the audio data (potentially even all frames of the audio data). If so, the respective hum noise frequency can be assumed to relate to actual hum noise. Otherwise, if the at least one hum noise frequency is not present as a peak in the frequency spectra of the majority of frames of the audio data, the at least one hum noise frequency may be disregarded at step S150 when removing the hum noise. The majority of frames of the audio data may relate to a predefined share of frames of the audio data, such as 90% of all frames, 95% of all frames, etc. Accordingly, hum noise frequencies determined from the noise spectrum may only be considered for hum noise removal if they are present in the predefined share (or more) of the frames of the audio signal. In some implementations, hum noise frequencies determined from the noise spectrum may only be considered for hum noise removal if they are present throughout the audio data (e.g., from the first frame to the last).

It is further understood that techniques according to the present disclosure may be used both in an offline scenario and an online scenario. In the offline scenario, it is assumed that the entire audio data is available at once (simultaneously), so that an analysis of hum noise may be based on all frames of the audio data. For offline processing, the noise spectrum can be determined based on frequency spectra of all frames of the audio data that are classified as noise frames.

In an online scenario, the frames of the audio data are provided one by one for the analysis. That is, for online processing, the method 100 would involve sequentially receiving and processing the frames of the audio data. Then, for a current frame, if the current frame is classified as a noise frame at step S110, the noise spectrum would be updated at step S120 based on a frequency spectrum of the current frame. Steps S130 to S150 would proceed substantially as described above. This may involve, for example, determining one or more updated hum noise frequencies from the updated noise spectrum at step S130, generating an updated estimated hum noise signal based on the one or more updated hum noise frequencies at step S140, and removing hum noise from the current frame based on the updated estimated hum noise signal at step S150.

Figure 10:
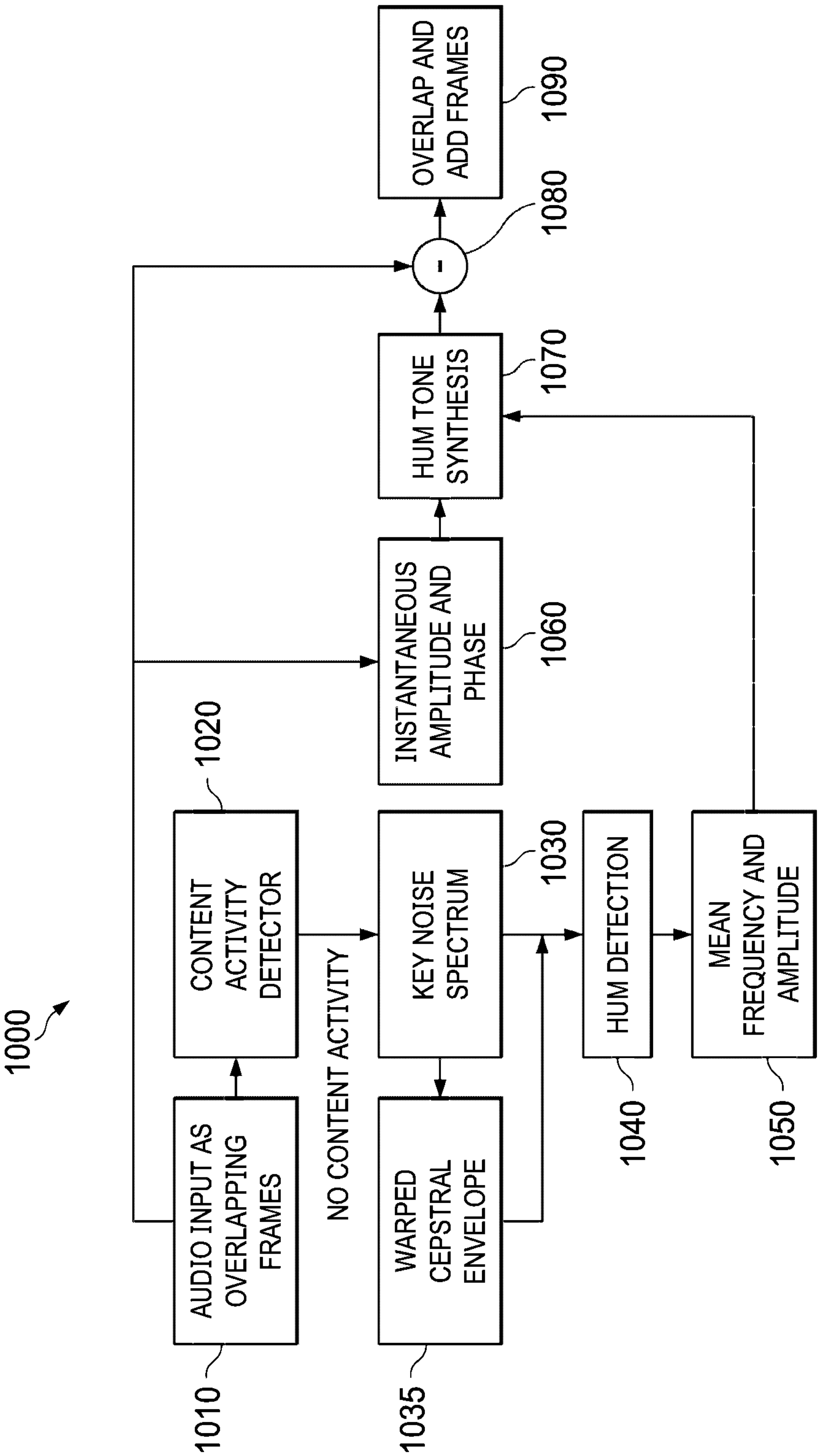
FIG. 10 is a block diagram illustrating an example of a functional overview of techniques according to embodiments of the disclosure.

FIG. 10 is a block diagram illustrating a non-limiting example of a functional overview 1000 of techniques according to embodiments of the disclosure, in line with the above description. It is to be noted that the blocks shown in this figure and their corresponding functions may be implemented in software, hardware, or a combination of software and hardware.

Block 1010 receives the audio input as (overlapping) frames. Block 1020 implements one or more content activity detectors for classifying the frames, for example in line with step S110 described above. If a frame has no content activity, i.e., is a noise frame, it is provided to block 1030 for estimating the noise spectrum (e.g., KNS). This may be done in line with step S120 described above, for example. Block 1035 determines a smoothed envelope, such as the cepstral envelope, of the noise spectrum. The noise spectrum and the smoothed envelope are used at block 1040 to perform hum detection, e.g., by detecting outlier peaks of the noise spectrum above the smoothed envelope. Block 1050 then determines the hum noise frequencies and mean hum amplitudes based on an outcome of the hum detection. Operations of blocks 1035, 1040, and 1050 may proceed in line with step S130 described above, for example. The determined hum noise frequencies and mean hum amplitudes are provided to block 1070 for hum tone synthesis. If a frame has no content activity, i.e., is a noise frame, the instantaneous amplitudes and phases are determined at block 1060. This may further use the hum noise frequencies determined by block 1050. Hum tone synthesis is then performed at block 1070. Details thereof may depend on the particular implementation and/or the classification of the frame(s) for which hum noise is to be removed. Operations of blocks 1060 and 1070 may proceed in line with step S140 described above, for example. The synthesized hum tones are then subtracted from respective frames at adder/subtractor 1080. This may be in line with step S150 described above, for example. Finally, overlap and add is performed at block 1090 to generate an output signal. Block 1090 may or may not be part of the actual hum noise removal process, depending on the particular implementation.

Figure 11:
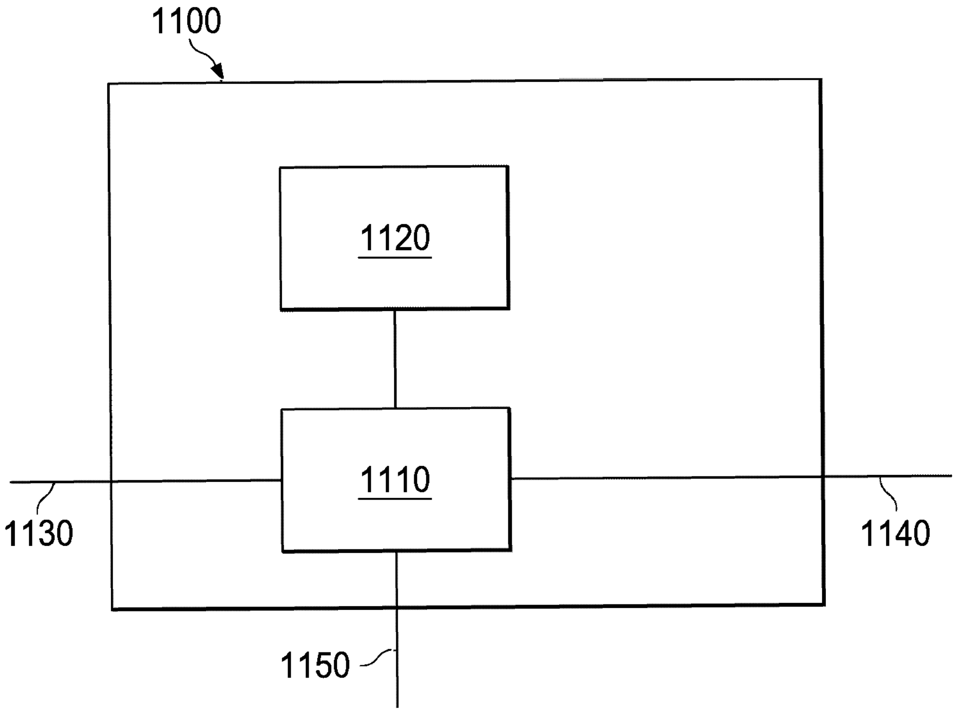
FIG. 11 is a block diagram of an apparatus for performing methods according to embodiments of the disclosure.

The present disclosure likewise relates to apparatus for performing methods and techniques described throughout the disclosure. FIG. 11 shows an example of such apparatus 1100. Said apparatus 1100 comprises a processor 1110 and a memory 1120 coupled to the processor 1110. The memory 1120 may store instructions for the processor 1110. The processor 1110 may receive audio data 1130 as input. The audio data 1130 may have the properties described above in the context of respective methods of hum noise detection and/or hum noise removal. The processor 1110 may be adapted to carry out the methods/techniques described throughout this disclosure. Accordingly, the processor 1110 may output denoised audio data 1140. Further, the processor 1110 may receive input of one or more control parameters 1150. These control parameters 1150 may include control parameters for controlling aggressiveness of hum noise removal, for example.

Interpretation

Aspects of the systems described herein may be implemented in an appropriate computer-based sound processing network environment (e.g., server or cloud environment) for processing digital or digitized audio files. Portions of the adaptive audio system may include one or more networks comprising any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through one or more computer programs that control execution of one or more processor-based computing devices of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Specifically, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software-based devices, as well as a plurality of different structural components, may be utilized to implement the embodiments. For example, "content activity detectors" described herein can include one or more electronic processors, one or more computer-readable medium modules, one or more input/output interfaces, and various connections (e.g., a system bus) connecting the various components.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

ENUMERATED EXAMPLE EMBODIMENTS

Various aspects and implementations of the present disclosure may also be appreciated from the following enumerated example embodiments (EEEs), which are not claims.

EEE1. A method for automatic detection and removal of hum noise from audio data comprising: dividing audio into a plurality of overlapping frames; classifying each of the plurality of overlapping frames as speech/music or noise using one or more content activity detectors (CAD); estimating a key noise spectrum (KNS) in a subset of the plurality of overlapping frames; identifying a set of hum frequencies from the key noise spectrum; estimating a set of hum amplitudes associated with the set of hum frequencies from the mean noise spectrum (MNS; e.g., mean spectrum based on the subset of frames classified as noise); estimating a set of instantaneous amplitudes and a set of instantaneous phases associated with the set of hum frequencies at each short-time frame; synthesizing a set of hum tones in accordance with the set of hum frequencies; and subtracting the synthesized set of hum tones for one or more short-time frames of the audio.

EEE2. The method of EEE1, wherein dividing the received audio into a plurality of overlapping frames includes applying a windowing function and a frame sizes selected according to one or more low-frequency tone associated with the audio (e.g., selected to sufficiently resolve the lowest audible frequencies present in the audio).

EEE3. The method of EEE1 or EEE2, wherein the one or more CADs include a plurality of CADs in parallel dedicated to detecting different content types.

EEE4. The method of any one of EEE1 to EEE3, wherein KNS is estimated in accordance with (e.g., based on) the average spectrum of the frames classified as noise (MNS).

EEE5. The method of any one of EEE1 to EEE3, wherein KNS is estimated in accordance with (e.g., based on) the noise spectrum including the largest energy weighted with MNS.

EEE6. The method of EEE4, wherein all noise frames across a file are taken into account (e.g., all frames across a file classified as noise are utilized to KNS) for an offline scenario.

EEE7. The method of EEE4, wherein consecutively received noise frames are adaptively taken into account (e.g., as noise frames within a file are analyzed, KNS is updated) for an online scenario.

EEE8. The method of any one of EEE1 to EEE7, where the one or more CADs determine frequency dependent probabilities.

EEE9. The method of any one of EEE1 to EEE8, wherein the set of hum frequencies are identified as the outlier peaks compared to the expected values defined by the cepstral envelope of KNS.

EEE10. The method of EEE9, wherein the cepstral envelope is estimated on a perceptually warped scale (e.g., Mel scale, Bark scale, etc.).

EEE11. The method of EEE9 or EEE10, where the detection is defined by a magnitude threshold above the cepstral envelope.

EEE12. The method of EEE11, wherein the magnitude threshold is an adaptive threshold (e.g., adaptive to different frequency bands).

EEE13. The method of any one of EEE1 to EEE12, wherein the instantaneous amplitudes and the instantaneous phases are estimated at the hum frequencies.

EEE14. The method of EEE13, wherein estimating instantaneous amplitudes or estimating instantaneous phases includes performing a least square estimation method in the time domain.

EEE15. The method of any one of EEE1 to EEE14, wherein synthesizing the set of hum tones includes summing a plurality of sinusoids based on the identified set of hum frequencies, and the estimated set of instantaneous phases.

EEE16. The method of EEE15, wherein synthesizing the set of hum tones is further based on the amplitudes estimated from MNS; and wherein the one or more short-time frames of the audio are frames containing speech/music.

EEE17. The method of EEE15, wherein synthesizing the set of hum tones is further based on the estimated set of instantaneous amplitudes; and wherein the one or more short-time frames of the audio are frames containing noise.

EEE18. The method of EEE15, wherein synthesizing the set of hum tones is further based on the amplitudes estimated from MNS; and wherein the one or more short-time frames of the audio include frames containing speech/music and frame containing noise (e.g., the amplitudes estimated from MNS are used to synthesize and cancel hum from for all frames or otherwise regardless of how the frames have been classified by the one or more CADs).

I claim:

1. A method of processing audio data, wherein the audio data comprises a plurality of frames, the method comprising:

classifying frames of the audio data as either content frames or noise frames, using one or more content activity detectors;

determining a noise spectrum from one or more frames of the audio data that are classified as noise frames;

determining one or more hum noise frequencies based on the determined noise spectrum;

generating an estimated hum noise signal based on the one or more hum noise frequencies; and removing hum noise from at least one frame of the audio data based on the estimated hum noise signal.

2. The method according to claim 1, wherein the one or more hum noise frequencies are determined as outlier peaks of the noise spectrum.

3. The method according to claim 1, wherein determining the one or more hum noise frequencies involves:

determining a smoothed envelope of the noise spectrum; and determining the one or more hum noise frequencies as outlier peaks of the noise spectrum compared to the smoothed envelope.

4. The method according to claim 3, wherein the smoothed envelope is determined on a perceptually warped scale.

5. The method according to claim 3, wherein a peak of the noise spectrum is decided to be an outlier peak if its magnitude is above the smoothed envelope by more than a threshold.

6. The method according to claim 5, wherein the threshold is a frequency-dependent threshold.

7. The method according to claim 1, wherein the noise spectrum is determined based on an average of frequency spectra of the one or more frames that are classified as noise frames.

8. The method according to claim 1, wherein the noise spectrum is determined based on a frequency spectrum that includes the largest energy among the frequency spectra of the one of the one or more frames that are classified as noise frames.

9. The method according to claim 1, wherein generating the estimated hum noise signal involves:

for each hum noise frequency, determining a respective hum noise phase based on the respective hum noise frequency and the audio data in the at least one frame; and synthesizing a respective hum tone for each of the one or more hum noise frequencies based on the hum noise frequency and the respective hum noise phase.

10. The method according to claim 9, wherein generating the estimated hum noise signal involves:

for each hum noise frequency, determining a respective hum noise amplitude based on the respective hum noise frequency and the audio data in the at least one frame;

for each hum noise frequency, determining a respective mean hum noise amplitude based on the noise spectrum; and synthesizing the respective hum tone for each of the one or more hum noise frequencies based on the respective hum noise frequency, the respective hum noise phase, and a smaller one of the respective hum noise amplitude and the respective mean hum noise amplitude.

11. The method according to claim 9, wherein generating the estimated hum noise signal involves, when the at least one frame is classified as a noise frame:

for each hum noise frequency, determining a respective hum noise amplitude based on the respective hum noise frequency and the audio data in the at least one frame; and synthesizing the respective hum tone for each of the one or more hum noise frequencies based on the respective hum noise frequency, the respective hum noise phase, and the respective hum noise amplitude.

12. The method according to claim 9, wherein generating the estimated hum noise signal involves, when the at least one frame is classified as a content frame:

for each hum noise frequency, determining a respective mean hum noise amplitude based on the noise spectrum; and synthesizing the respective hum tone for each of the one or more hum noise frequencies based on the respective hum noise frequency, the respective hum noise phase, and the respective mean hum noise amplitude.

13. The method according to claim 1, wherein generating the estimated hum noise signal involves:

for each hum noise frequency, determining a respective mean hum noise amplitude based on the noise spectrum; and synthesizing the respective hum tone for each of the one or more hum noise frequencies based on the respective hum noise frequency and the respective mean hum noise amplitude.

14. The method according to claim 1, wherein removing hum noise from the at least one frame involves subtracting the estimated hum noise signal from the at least one frame.

15. The method according to claim 1, wherein the noise spectrum is determined based on frequency spectra of all frames of the audio data that are classified as noise frames.

16. The method according to claim 1, comprising:

sequentially receiving and processing the frames of the audio data; and for a current frame, if the current frame is classified as a noise frame, updating the noise spectrum based on a frequency spectrum of the current frame.

17. The method according to claim 1, wherein the noise spectrum is determined from a plurality of frames that are classified as noise frames; and the method further comprises:

determining a variance over time of the one or more hum noise frequencies based on frequency spectra of the plurality of frames that are classified as noise frames; and depending on the variance over time, applying band pass filtering to the frames of the audio data, wherein the band pass filter is designed such that the stop bands include the one or more hum noise frequencies.

18. The method according to claim 1, further comprising:

for at least one of the one or more hum noise frequencies, determining whether the at least one hum noise frequency is present as a peak in the frequency spectra of a majority of frames of the audio data; and disregarding the at least one hum noise frequency when removing the hum noise if the at least one hum noise frequency is not present as a peak in the frequency spectra of the majority of frames of the audio data.

19. An apparatus comprising a processor and a memory coupled to the processor and storing instructions for the processor, wherein the processor is configured to perform all steps of the method according to claim 1.

20. A non-transitory computer-readable storage medium storing a computer program comprising instructions that, when executed by a computing device, cause the computing device to perform all steps of the method according to claim 1.

* * * * *